(12) United States Patent
Sharifi et al.

(10) Patent No.: US 10,133,533 B1
(45) Date of Patent: Nov. 20, 2018

(54) AUTOMATIC DETECTION AND CORRECTION OF MISALIGNMENT BETWEEN DISPLAY DEVICES

(71) Applicant: Google Inc., Mountain View, CA (US)

(72) Inventors: Matthew Sharifi, Kilchberg (CH); Jakob Foerster, Oxford (GB)

(73) Assignee: Google LLC, Mountain View, CA (US)

( * ) Notice: Subject to any disclaimer, the term of this patent is extended or adjusted under 35 U.S.C. 154(b) by 47 days.

(21) Appl. No.: 15/382,486

(22) Filed: Dec. 16, 2016

(51) Int. Cl.
*G09G 5/00* (2006.01)
*G06F 3/14* (2006.01)
*G06F 3/0482* (2013.01)
*G06F 3/033* (2013.01)

(52) U.S. Cl.
CPC ............ *G06F 3/1462* (2013.01); *G06F 3/033* (2013.01); *G06F 3/0482* (2013.01); *G06F 3/1423* (2013.01)

(58) Field of Classification Search
CPC .... G06F 3/0346; G06F 3/04842; G06F 3/033; G06F 3/03547; G06F 3/03549; G06F 3/0482; G06F 3/04886; G06F 2203/04806; G06F 3/0481; G06F 2203/04805; G06F 3/04845; G06F 17/50; G06F 3/011; G06F 3/016; G06F 3/017; G06F 17/21; G06F 17/212; G06F 17/2705; G06F 19/321; G06F 19/322; G06F 19/3406; G06F 19/3487; G06F 2203/04803; G06F 3/014; G06F 3/0233; G06F 3/0338; G06F 3/0426; G06F 3/04815; G06F 3/04817; G06F 3/0484; G06F 3/04855; G06F 8/41; G09G 2320/0693; G09G 5/08; G09G 2320/0285
USPC .................................. 345/1.1–1.3, 156–163
See application file for complete search history.

(56) References Cited

U.S. PATENT DOCUMENTS

| | | | |
|---|---|---|---|
| 7,557,774 B2 * | 7/2009 | Baudisch | ................ G06F 3/038 345/1.1 |
| 8,407,608 B1 * | 3/2013 | Franklin | ............. G06F 3/04812 715/756 |
| 2014/0184652 A1 | 7/2014 | Matel | |

* cited by examiner

*Primary Examiner* — Duc Q Dinh
(74) *Attorney, Agent, or Firm* — Morgan, Lewis & Bockius LLP (57) ABSTRACT

Aspects of the subject technology relate to aligning display devices. A trajectory path of a pointer between a first point on a first display device and a second point on a second display device is captured. A first direction of a first portion of the trajectory path on the first display device is determined. A second direction of a second portion of the trajectory path on the second display device is determined. An adjustment value to correct a misalignment between the first display device and the second display device is determined based on a difference between the first direction and the second direction.

20 Claims, 6 Drawing Sheets

AUTOMATIC DETECTION AND CORRECTION OF MISALIGNMENT BETWEEN DISPLAY DEVICES

BACKGROUND

The present disclosure generally relates to the alignment of display devices, and in particular, to detecting and correcting misalignment between display devices.

Users connect additional external display devices to their laptop or desktop computers to extend the desktop thereof. Misalignment between the display and the external display device may occur and lead to suboptimal experience for the user when moving a pointer across the extended desktop between the display and the external display device. In addition, because of the mobility of laptops and notebooks, the arrangement of a display of a laptop or notebook computer and an external display device may change more frequently requiring more frequent adjustments.

SUMMARY

Aspects of the subject technology relate to a computer-implemented method. The method may include capturing a trajectory path of a pointer between a first point on a first display device and a second point on a second display device. The method also may include determining a first direction of a first portion of the trajectory path on the first display device and determining a second direction of a second portion of the trajectory path on the second display device. The method further may include determining an adjustment value to correct a misalignment between the first display device and the second display device based on a difference between the first direction and the second direction.

Aspects of the subject technology also relate to a computing system. The system may include one or more processors and a non-transitory computer-readable medium comprising instructions stored therein, which, when processed by the one or more processors, cause the one or more processors to perform operations. The operations include obtaining a plurality of trajectory points along a trajectory path of a pointer between a first point on a first display device and a second point on a second display device. The operations also include determining a first direction of a first portion of the trajectory path on the first display device and determining a second direction of a second portion of the trajectory path on the second display device. The operations further include determining an adjustment value to correct a misalignment between the first display device and the second display device based on a difference between the first direction and the second direction.

Aspects of the subject technology also relate to a non-transitory computer-readable medium including instructions stored therein, which when executed by a processor, cause the machine to perform operations including capturing a trajectory path of a pointer between a first point on a first display device and a second point on a second display device. The operation also may include segmenting the trajectory path of the pointer into a plurality of segments, obtaining a plurality of data points based on the plurality of segments, and identifying a first clustered set of data points and a second clustered set of data points based on the obtained plurality of data points. The operations further include determining the first portion of the trajectory path based on the first clustered set of data points, determining the second portion of the trajectory path based on the second clustered set of data points, determining a first direction of the first portion of the trajectory path on the first display device, and determining a second direction of the second portion of the trajectory path on the second display device. The operations also include determining an adjustment value to correct a misalignment between the first display device and the second display device based on a difference between the first direction and the second direction.

It is understood that other configurations of the subject technology will become readily apparent to those skilled in the art from the following detailed description, where various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed aspects and together with the description serve to explain the principles of the disclosed aspects.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description may include specific details for the purpose of providing a thorough understanding of the subject technology. However, the subject technology is not limited to the specific details set forth herein and may be practiced without these specific details. In some instances, structures and components are shown in block diagram form in order to avoid obscuring the concepts of the subject technology.

The subject technology provides systems and methods for correcting a misalignment of an extended desktop between multiple display devices (e.g., screens, monitors, displays). When connecting the multiple display devices to a computer, the user may align the multiple display devices via a user interface so that the desktop extending across the multiple display devices aligns between the multiple display devices. However, the alignment via the user interface may not be precise, and the user may experience a slight misalignment of the extended desktop between the multiple display devices especially when moving a pointer between the multiple display devices. The misalignment of the extended desktop between the multiple display devices may be detected through tracking the movement of the pointer and providing an adjustment value to correct the misalignment between the multiple display devices.

Figure 1:
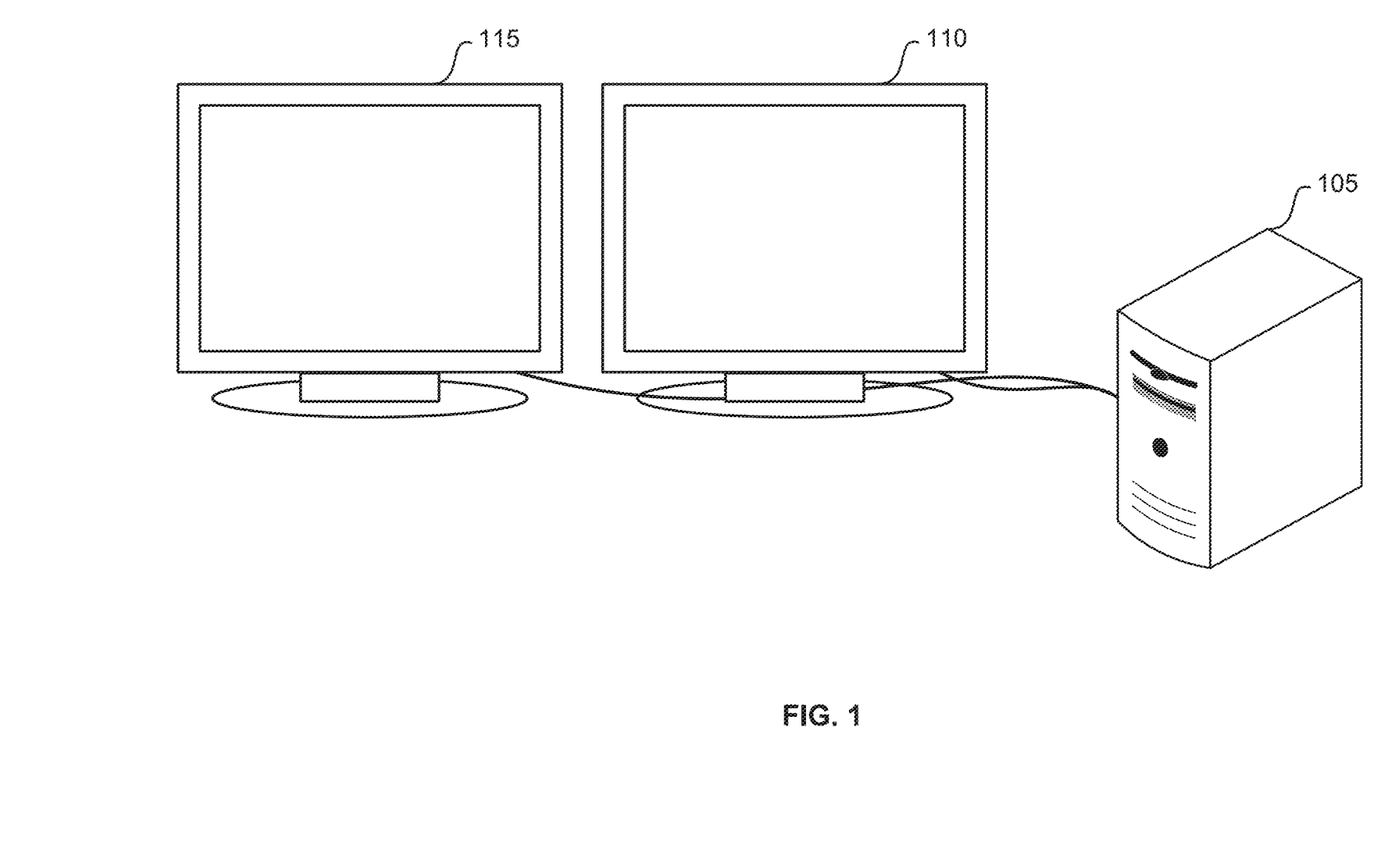
FIG. 1 illustrates an example multi-display computer system according to example aspects of the subject technology.

FIG. 1 illustrates an example multi-display computer system 100 according to example aspects of the subject technology. The multi-display computer system 100 may include a computer 105, a first display device 110, and a second display device 115. The first display device 110 and the second display device 115 are connected to the computer 105, and are arranged to contiguously display a desktop of the computer 105.

The multi-display computer system 100 may not be limited to two display devices connected to the computer, and may include more than two display devices connected to the computer. A laptop computer may be provided in place of the computer 105 and one of the first display device 110 or the second display device 115.

The sizes of the first display device 110 and the second display device 115 may be the same or different from each other. The orientations of the first display device 110 and the second display device 115 may be the same or different from each other. The orientations of the display devices may be landscape, portrait, or tilted. Although in FIG. 1 the first display device 110 and the second display device 115 are set next to each other horizontally, the first display device 110 and the second display device 115 may be vertically set. The first display device 110 and the second display device 115 may not be physical aligned with each other, and may be offset.

Figure 2A:
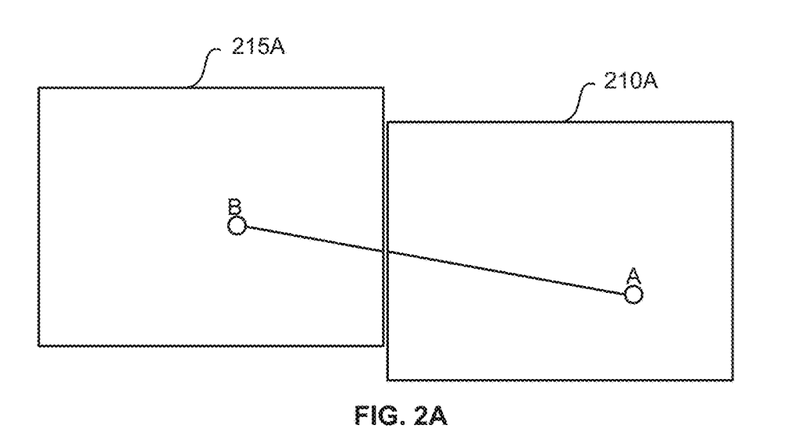
FIGS. 2A through 2C illustrate example trajectory paths, according to example aspects of the subject technology.
Figure 2B:
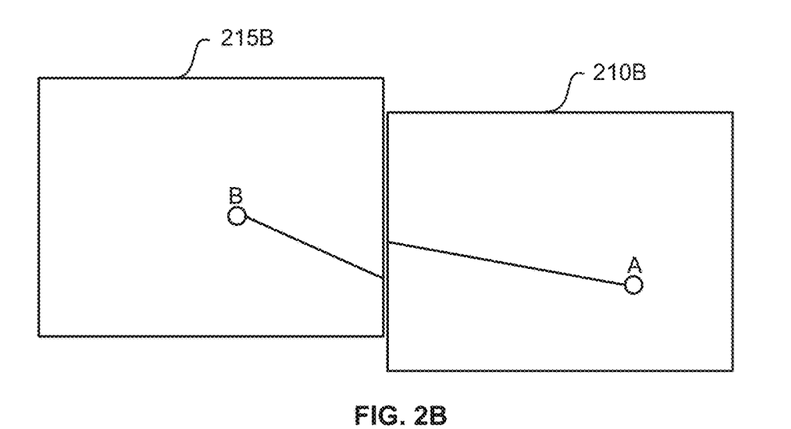
Figure 2C:
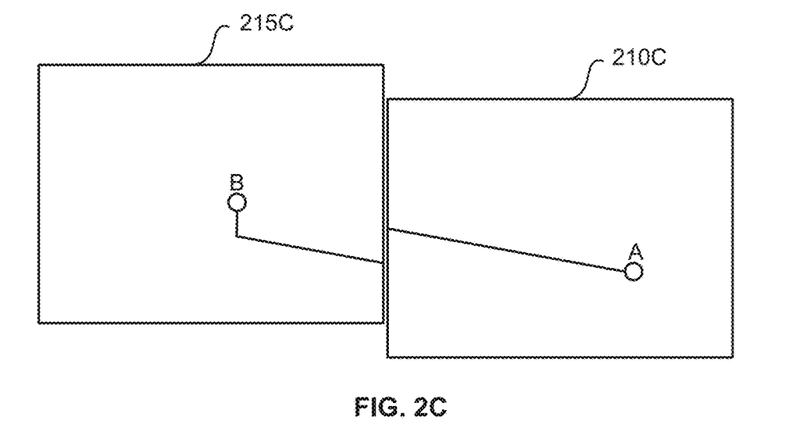

FIGS. 2A through 2C illustrate example trajectory paths of a pointer, according to example aspects of the subject technology. FIG. 2A illustrates an example trajectory path of a pointer when there is no misalignment between a first display device 210A and a second display device 215A. The user moves the pointer from a start point A towards an end point B (e.g., target element) in one continuous motion using an input device (e.g., mouse, trackball, joystick, etc.). For example, the continuous motion is defined based on the locations and times of the pointer which may be tracked and recorded periodically as described later in detail with respect FIG. 3A. The pointer movement is tracked as trajectory points each of which is associated with a location on the desktop and a timestamp. The motion or movement of a pointer may be determined to be continuous based on each of the succeeding trajectory points within a predefined distance and/or having timestamp within a predefined period of time from the respective preceding trajectory point.

The end point B may be a user interface (UI) element (e.g., application icon, menu button, etc.), and the end point B may be defined as the UI element when the user interacts (e.g., clicks, touches, presses, etc.) with the UI element. The start point A may be defined by reverse tracking the pointer movement from the end point B. For example, the start point A may be reverse tracked from the end point B for a predetermined amount of time or distance based on the tracked pointer movement. If the data of reverse tracking the pointer movement for a predetermined amount of time or distance indicates that the pointer crossed the boundary between the first display device 210A and the second display device 215A, the start point A may be defined by designating the beginning point of a continuous movement of the pointer. The beginning point of the continuous movement of the pointer may be a point where the pointer movement indicated a continuous movement for a predefined period of time.

The line between the start point A and the end point B is a visual representation of the actual path (e.g., trajectory path) along which the pointer moved. As illustrated, the trajectory path in FIG. 2A appears to be continuous between the first display device and the second display device. In other words, the point where the line ends on the first display device visually matches the point where the line starts on the second display device. The example trajectory path of the pointer illustrated in FIG. 2A is indicative of aligned display devices.

FIG. 2B illustrates an example trajectory path of a pointer when there is a misalignment between a first display device 210B and a second display device 215B. The user moves the pointer using an input device from the start point A towards the end point B. When the pointer crosses the boundary between the first display device and the second display device, the pointer appears at a point on the second display device 215B that does not visually match with the point where the line ends on the first display device 210B. The example trajectory path of the pointer illustrated in FIG. 2B is indicative of misaligned display devices.

Noticing a jump in the pointer movement, the user manually adjusts a direction of the pointer movement after the pointer crosses the boundary in order to reach to the end point B. Accordingly, the trajectory path of the pointer in FIG. 2B includes at least two portions each having different slopes from each other: a portion on the first display device 210B having a first slope (i.e., a portion from the start point A to when the user adjusted the pointer movement); and another portion on the second display device 215B having a second slope that is different from that of the portion on the first display device 210B (i.e., a portion from the boundary where the user adjusted the pointer movement to the end point B).

FIG. 2C illustrates another example trajectory path of a pointer when there is a misalignment between a first display device 210C and a second display device 215C. The user moves the pointer using an input device from the start point A towards the end point B. When the pointer crosses the boundary between the first display device and the second display device, the pointer appears at a point on the second display device that does not visually match with the point where the line ends on the first display device. However, in FIG. 2C, the user may not notice the change in the pointer path until the pointer crossed the boundary and reached the vicinity of the end point B. Therefore, the user moves the direction of the pointer upwards in order to reach to the end point B. The trajectory path of the pointer in FIG. 2C also includes two portions each having different slopes from each other: a portion from the start point A to where the user adjusted the pointer movement; and another portion from where the user adjusted the pointer movement so that the pointer moved upwards to the end point B. The example trajectory path of the pointer illustrated in FIG. 2B is indicative of misaligned display devices.

Figure 3A:
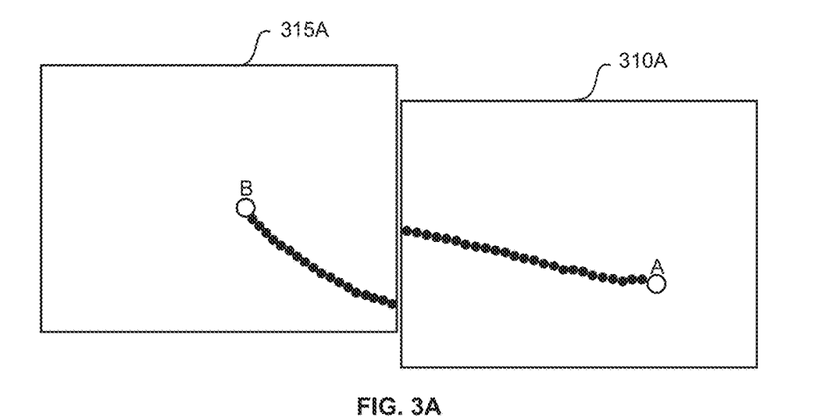
FIGS. 3A through 3C illustrate an example sequence of capturing a trajectory path of a pointer, according to example aspects of the subject technology.
Figure 3B:
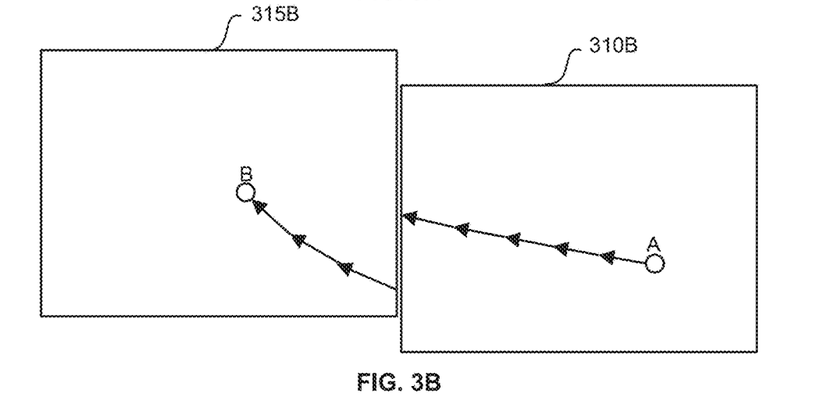
Figure 3C:
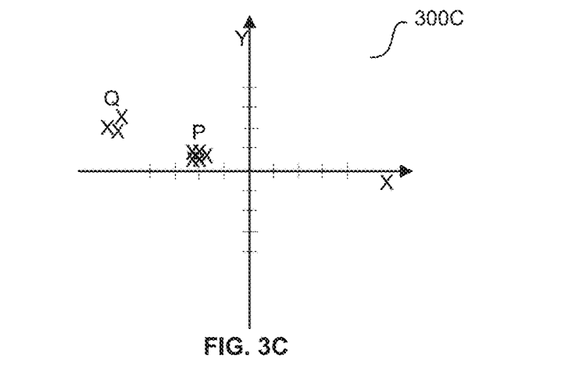

FIGS. 3A through 3C illustrate an example sequence of capturing a trajectory path of a pointer, according to example aspects of the subject technology. When the user moves a pointer between the first display device 310A and the second display device 315A, the movement (i.e., trajectory path) of the pointer may be tracked by a pointer module. The pointer module manages the pointer by tracking and recording the movement of the pointer. The pointer module may reside within the operating system of the computer (e.g., computer 105) or within a driver of the input device, for example. As illustrated in FIG. 3A, the pointer module tracks the trajectory path of the pointer as an array of trajectory points between a starting point A and an ending point B. Each trajectory point defines a position (e.g., coordinate position) of the pointer at a given time (e.g., timestamp) in the desktop. The tracked trajectory points may be buffered by the pointer module in a memory for further processing discussed below.

According to aspects of the subject technology, the array of trajectory points is segmented into subsets of trajectory points and forms a plurality of segments as illustrated in FIG. 3B with arrows. The trajectory points may be grouped into the segments based on the timestamps or distance. For example, the first segment may include trajectory points having timestamps that are within a predetermined time or distance of the first trajectory point. The trajectory points may also be divided into segments so that each segment includes the same or similar number of trajectory points.

The coordinates of the beginning trajectory point and the end trajectory point for each of the segments are identified to determine the slope of the respective segments. Based on the slopes of the segments, the segments are transformed into a plurality of data points in a two-dimensional coordinate system 300C as illustrated in FIG. 3C. The x-axis of the coordinate system represents a difference in the x-value of one segment. The y-axis of the coordinate system represents a difference in the y-value of one segment. For example, the first segment next to the start point A has a slope having a difference of −2 in x-value and a difference of +0.75 in y-value. Accordingly, the first segment is reproduced in a two-dimensional coordinate system 300C as (−2, +0.75). The differences in the x-value and y-value of the slopes of the segments are plotted as a data point that is represented by an "x" in the two-dimensional coordinate system shown in FIG. 3C.

When the rest of the segments are transformed into respective data points in the coordinate system, for example illustrated in FIG. 3C, two distinct clusters are present for one trajectory path of the pointer: a cluster P that represents a first portion (e.g., arrows on the first display device) of the trajectory path; and a cluster Q that represents a second portion (e.g., arrows on the second display device) of the trajectory path. For example, the clusters may be determined using K-means clustering method, wherein the k-value may be set to a number of clusters into which the data points are divided. However, other methods may be used to identify clusters in the data points.

Referring back to FIG. 2A, when the trajectory points of the trajectory path between the two display devices are transformed into data points in the coordinate system, because the data points may be close together, only one cluster may appear in the coordinate system indicating little or no change in direction. Referring to FIG. 2C, the trajectory path has two portions each having a direction different from each other, thus, similar to the example of FIG. 2B, the trajectory path of FIG. 2C will also have two distinct clusters when its plurality of segments are transformed into respective data points on the coordinate system.

Returning to FIG. 3C, the centers of the cluster P and the cluster Q are determined based on, for example, K-means clustering method. The centers of the cluster P and the cluster Q may be used to represent the directions of the first portion and the second portion of the trajectory path. For example, the coordinate points of the center of the cluster P are used to represent a slope of the first portion of the trajectory path, and the coordinate points of the center of the cluster Q are used to represent a slope of the second portion of the trajectory path.

Figure 4A:
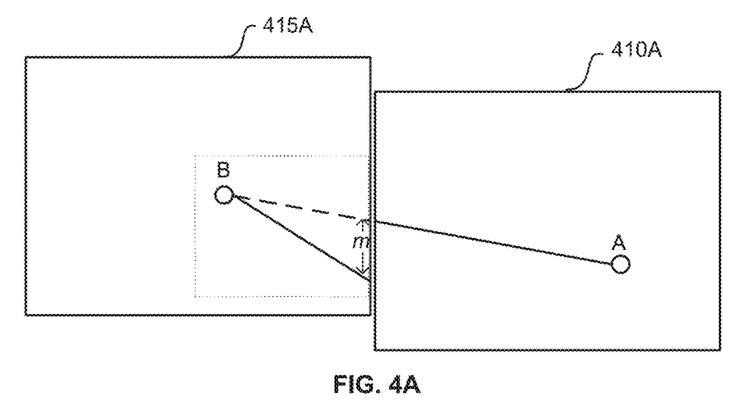
FIGS. 4A through 4C illustrate an example sequence of adjusting a misalignment, according to example aspects of the subject technology.
Figure 4B:
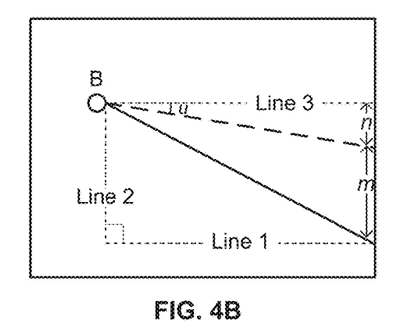
Figure 4C:
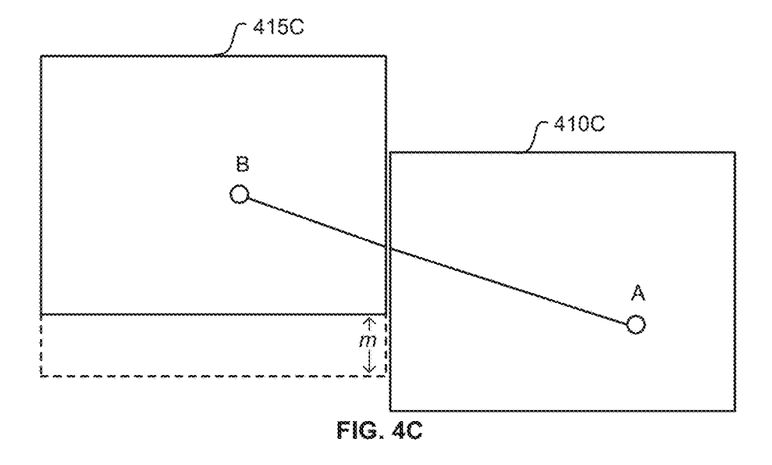

FIGS. 4A through 4C illustrate an example sequence of adjusting a misalignment, according to example aspects of the subject technology. When the distance between the two clusters is equal to or larger than a threshold distance, the adjustment value to correct the misalignment between the first display device and the second display device may be determined.

The first portion of the trajectory path is shown in dashed line on the second display device 415A in FIG. 4A. The second portion of the trajectory path is shown in the solid line on the second display device 415A. For example, the directions of the first portion and the second portion may be determined based on the respective slopes determined from the clustering method described above, for example. The adjustment value to correct the misalignment between the first display device and the second display device may be determined based on the directions of the first portion and the second portion of the trajectory path. The bidirectional arrow m between the dashed line and the solid line on the second display device 415A shows the difference (i.e., adjustment value) in the alignment of the extended desktop between the first display device 410A and the second display device 415A.

FIG. 4B illustrates an enlarged view of a section of the second display device 415A enclosed by a dotted line. The length of the bidirectional arrow m may be determined using trigonometry functions. For example, Line 1 and Line 2 form a right angle with the solid line that represents a second portion of the trajectory path. Further, because Line 3 and the right edge of the second display device form a right angle and the length of Line 3 and the length of the dashed line are known, the angle u can be determined. When the angle u is determined, the length of bidirectional arrow n can also be determined. Therefore, the length of the bidirectional arrow m can be calculated by subtracting the length of the bidirectional arrow n from the length of Line 2. The length of the bidirectional arrow m is the adjustment value to correct the misalignment of the extended desktop between the first display device and the second display device. Other methods may be used to determine the adjustment value based on the directions of the trajectory paths.

As illustrated in FIG. 4C, the desktop extending across the first display device 410C and the second display device 415C is virtually adjusted for the determined adjustment value in a vertical direction without physically adjusting the positions of the first display device 410C and the second display device 415C. The virtual adjustment of the extended desktop may be performed by a desktop manager module which resides within the operating system of the computer (e.g., computer 105). The change in the desktop position is illustrated by the bidirectional arrow m below the second display device 415C. When the pointer is moved across the first display device 410C and the second display device 415C, the directions of the first portion and the second portion of the trajectory path are equal to each other, thus, the extended desktop between the display devices is aligned.

Figure 5:
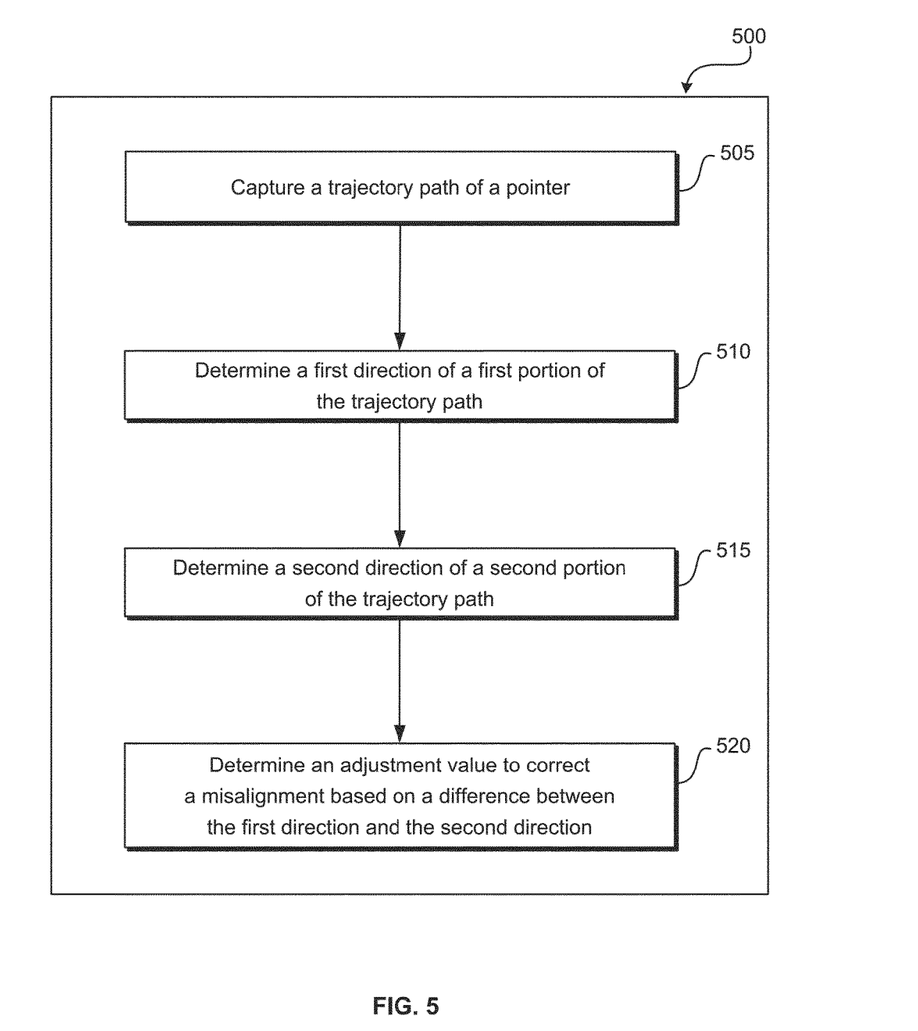
FIG. 5 shows a flowchart illustrating an example process for correcting a misalignment between displays, according to example aspects of the subject technology.

FIG. 5 shows a flowchart illustrating an example process 500 for correcting a misalignment of an extended desktop between display devices, according to example aspects of the subject technology. It is understood that the depicted order is an illustration of one or more example approaches, and is not meant to be limited to the specific order or hierarchy presented. The steps can be rearranged, and/or two or more of the steps can be performed simultaneously.

At block 505, a trajectory path of a pointer between a first point on a first display device and a second on a second display device is captured. For example, the pointer movement input from an input device from the start point A on the first display device to the end point B on the second display is tracked.

At block 510, a first direction of a first portion of the trajectory path is determined. At block, 515, a second direction of a second portion of the trajectory path is determined. For example, the trajectory path may be segmented into a plurality of segments based on the trajectory points, and the plurality of segments of the trajectory path is converted to data points that represent slope in a coordinate system. When two distinct clusters are formed in the coordinate system, the trajectory path may be determined to have two portions. The directions of the two portions may be determined based on the respective clusters.

At block 520, an adjustment value to correct a misalignment based on a difference between the first direction and the second direction is determined. A notification may be provided to notify a user of the misalignment between the first display device and the second display device. For example, the notification may be provided as a pop-up window or in a notification bar. The notification may present options to ignore the notification, allow the system to correct the misalignment, or prompt the user to manually correct the misalignment. The notification may also include an option to have the system automatically adjust the misalignment of the desktop between the display devices in the future. The user may further have options to set a threshold adjustment value when selecting the automatic adjustment option. For example, when the adjustment value satisfies a user specific adjustment value, the desktop manager module automatically adjusts the misalignment based on the adjustment value. The notification may include the adjustment value so that when the user chooses to manually correct the misalignment, the user can adjust precisely. The notification may be triggered only when a predetermined number of misalignments are detected.

Although the trajectory paths that cross the boundary between the display devices have been discussed above, the trajectory paths that do not cross the boundary may also be tracked and analyzed by the pointer module. For example, the pointer module may analyze a trajectory path that stays within a single display device to find variations in directions of the trajectory paths due to the user's natural movement. The trajectory path may be analyzed by segmenting the trajectory points of the trajectory path, transforming the segments into data points, and clustering the data points in the manner described above. The pointer module identifies a number of clusters formed by the data points, and determines the distance between the clusters. The determined distance may be set as a threshold for the user's natural movement. The threshold may be set after a predetermined number of samples have been analyzed and may be updated with subsequent samples being added to an average value.

The distance between two clusters formed based on trajectory points of a trajectory path that crosses the boundary may be compared to the threshold of the user's natural movement. If the distance exceeds the threshold, the system may determine that the change in direction of the trajectory path is due to misalignment and not the user's natural movement, and proceed to providing the notification.

Figure 6:
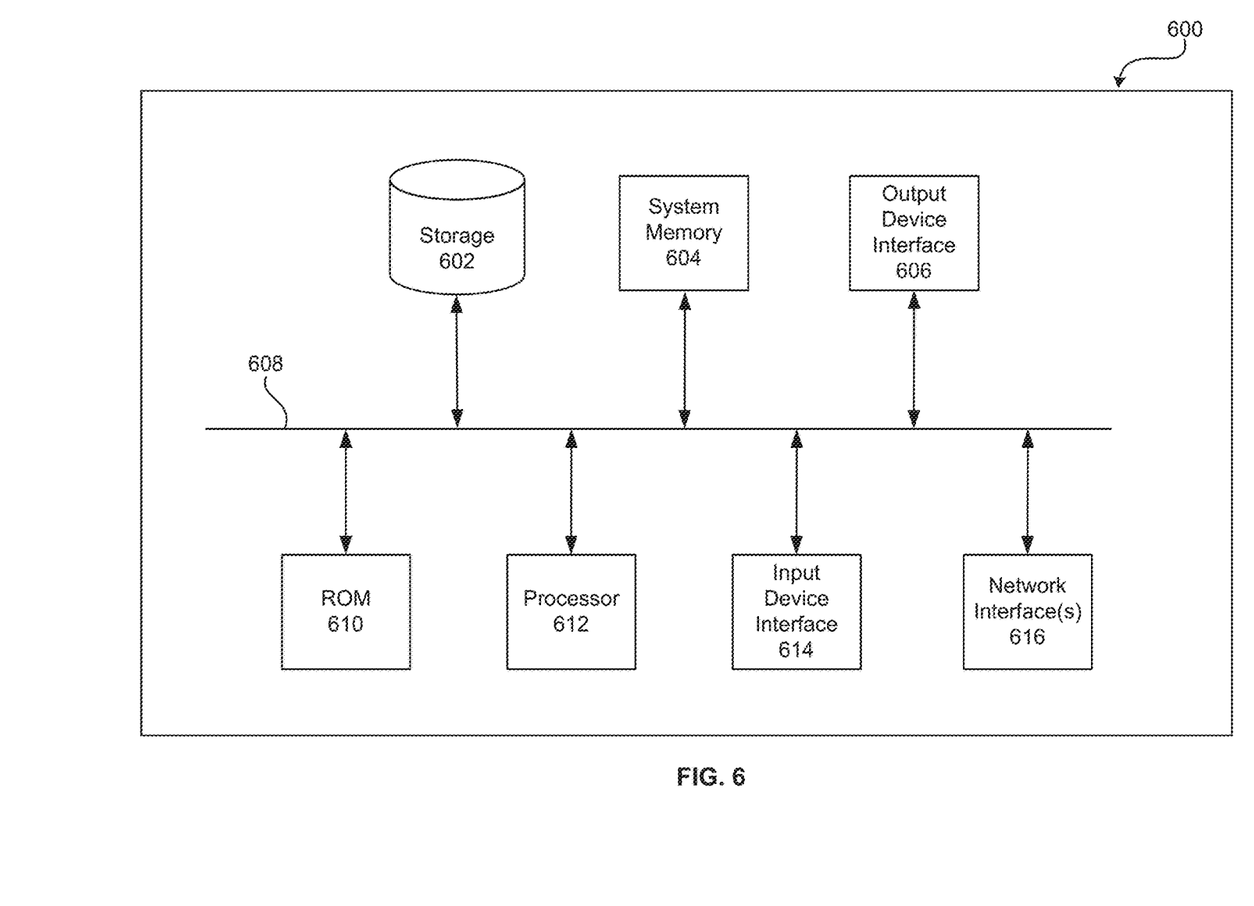
FIG. 6 conceptually illustrates an example electronic system with which some implementations of the subject technology can be implemented.

FIG. 6 conceptually illustrates an example electronic system 600 with which some implementations of the subject technology can be implemented. Electronic system 600 can be a computer, phone, personal digital assistant (PDA), or any other sort of electronic device. Such an electronic system includes various types of computer readable media and interfaces for various other types of computer readable media. Electronic system 600 includes a bus 608, processing unit(s) 612, a system memory 604, a read-only memory (ROM) 610, a permanent storage device 502, an input device interface 514, an output device interface 506, and a network interface 516.

Bus 608 collectively represents all system, peripheral, and chipset buses that communicatively connect the numerous internal devices of electronic system 600. For instance, bus 608 communicatively connects processing unit(s) 612 with ROM 610, system memory 604, and permanent storage device 602.

From these various memory units, processing unit(s) 612 retrieves instructions to execute and data to process in order to execute the processes of the subject disclosure. The processing unit(s) can be a single processor or a multi-core processor in different implementations.

ROM 610 stores static data and instructions that are needed by processing unit(s) 612 and other modules of the electronic system. Permanent storage device 602, on the other hand, is a read-and-write memory device. This device is a non-volatile memory unit that stores instructions and data even when electronic system 600 is off. Some implementations of the subject disclosure use a mass-storage device (for example, a magnetic or optical disk, and its corresponding disk drive) as permanent storage device 602.

Other implementations use a removable storage device (for example, a floppy disk, flash drive, and its corresponding disk drive) as permanent storage device 602. Like permanent storage device 602, system memory 604 is a read-and-write memory device. However, unlike storage device 602, system memory 604 is a volatile read-and-write memory, such as a random access memory. System memory 604 stores some of the instructions and data that the processor needs at runtime. In some implementations, the processes of the subject disclosure are stored in system memory 604, permanent storage device 602, or ROM 610. For example, the various memory units include instructions for displaying graphical elements and identifiers associated with respective applications, receiving a predetermined user input to display visual representations of shortcuts associated with respective applications, and displaying the visual representations of shortcuts. From these various memory units, processing unit(s) 612 retrieves instructions to execute and data to process in order to execute the processes of some implementations.

Bus 608 also connects to input and output device interfaces 614 and 606. Input device interface 614 enables the user to communicate information and select commands to the electronic system. Input devices used with input device interface 614 include, for example, alphanumeric keyboards and pointing devices (also called "cursor control devices"). Output device interfaces 606 enables, for example, the display of images generated by the electronic system 600. Output devices used with output device interface 606 include, for example, printers and display devices, for example, cathode ray tubes (CRT) or liquid crystal displays (LCD). Some implementations include devices, for example, a touchscreen that functions as both input and output devices.

Finally, as shown in FIG. 6, bus 608 also couples electronic system 600 to a network (not shown) through a network interface 616. In this manner, the computer can be a part of a network of computers (for example, a LAN, a WAN, or an Intranet, or a network of networks, for example, the Internet). Any or all components of electronic system 600 can be used in conjunction with the subject disclosure.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware, or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example, microprocessors, storage, and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra-density optical discs, any other optical or magnetic media, and floppy disks. The computer-readable media can store a computer program that is executable by at least one processing unit and includes sets of instructions for performing various operations. Examples of computer programs or computer code include machine code, for example, is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example, application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT or LCD monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, where reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

What is claimed is:

1. A computer-implemented method, comprising:
    capturing a trajectory path of a pointer between a first point on a first display device and a second point on a second display device;
    segmenting the trajectory path of the pointer into a plurality of segments;
    obtaining a plurality of data points based on the plurality of segments;
    identifying a first clustered set of data points and a second clustered set of data points based on the obtained plurality of data points;
    determining a first direction of a first portion of the trajectory path on the first display device based on the first clustered set of data points;
    determining a second direction of a second portion of the trajectory path on the second display device based on the second clustered set of data points; and
    determining an adjustment value to correct a misalignment between the first display device and the second display device based on a difference between the first direction and the second direction.

2. The computer-implemented method according to claim 1, wherein,
    each of the plurality of segments including a number of sequential trajectory points.

3. The computer-implemented method according to claim 2, further comprising:
    determining the first portion of the trajectory path based on the first clustered set of data points; and
    determining the second portion of the trajectory path based on the second clustered set of data points.

4. The computer-implemented method according to claim 1, wherein the first direction of the first portion of the trajectory path is determined based on a first X-value in an X-direction and a first Y-value in a Y-direction of the first clustered set of data points.

5. The computer-implemented method according to claim 1, wherein the second direction of the second portion of the trajectory path is determined based on a second X-value in the X-direction and a second Y-value in the Y-direction of the second clustered set of data points.

6. The computer-implemented method according to claim 1, wherein the first point on the first display device is a beginning of a continuous movement of the pointer to the second point on the second display device.

7. The computer-implemented method according to claim 1, wherein the second point on the second display device is a target element selected by a user action.

8. The computer-implemented method according to claim 1, further comprising providing for display a notification to notify a user of the misalignment between the first display device and the second display device, wherein the notification includes the adjustment value to correct a misalignment between the first display device and the second display device.

9. A computing system, comprising:
    one or more processors; and
    a non-transitory machine-readable medium comprising instructions stored therein, which when executed by the one or more processors, cause the one or more processors to perform operations comprising:
        segmenting a trajectory path of a pointer between a first point on a first display device and a second point on a second display device into a plurality of segments;
        obtaining a plurality of data points based on the plurality of segments;
        identifying a first clustered set of data points and a second clustered set of data points based on the obtained plurality of data points;
        determining a first direction of a first portion of the trajectory path on the first display device based on the first clustered set of data points;
        determining a second direction of a second portion of the trajectory path on the second display device based on the second clustered set of data points; and
        determining an adjustment value to correct a misalignment between the first display device and the second display device based on a difference between the first direction and the second direction.

10. The computing system according to claim 9, further comprising:
determining the first portion of the trajectory path based on the first clustered set of data points; and
determining the second portion of the trajectory path based on the second clustered set of data points.

11. The computing system according to claim 9, wherein the first direction of the first portion of the trajectory path is determined based on a first X-value in an X-direction and a first Y-value in a Y-direction of the first clustered set of data points.

12. The computing system according to claim 9, wherein the second direction of the second portion of the trajectory path is determined based on a second X-value in the X-direction and a second Y-value in the Y-direction of the second clustered set of data points.

13. The computing system according to claim 9, wherein the first point on the first display device is a beginning of a continuous movement of the pointer to the second point on the second display device.

14. The computing system according to claim 9, wherein the second point on the second display device is a target element selected by a user action.

15. The computing system according to claim 9, further comprising providing for display a notification to notify a user of the misalignment between the first display device and the second display device, wherein the notification includes the adjustment value to correct a misalignment between the first display device and the second display device.

16. A non-transitory computer-readable medium comprising instructions stored therein, which when executed by a processor, cause the computer to perform operations comprising:
capturing a trajectory path of a pointer between a first point on a first display device and a second point on a second display device;
segmenting the trajectory path of the pointer into a plurality of segments;
obtaining a plurality of data points based on the plurality of segments;
identifying a first clustered set of data points and a second clustered set of data points based on the obtained plurality of data points;
determining a first portion of the trajectory path based on the first clustered set of data points; and
determining a second portion of the trajectory path based on the second clustered set of data points;
determining a first direction of the first portion of the trajectory path on the first display device;
determining a second direction of the second portion of the trajectory path on the second display device;
determining an adjustment value to correct a misalignment between the first display device and the second display device based on a difference between the first direction and the second direction.

17. The non-transitory computer-readable medium according to claim 16, wherein the first direction of the first portion of the trajectory path is determined based on a first X-value in an X-direction and a first Y-value in a Y-direction of the first clustered set of data points, and
wherein the second direction of the second portion of the trajectory path is determined based on a second X-value in the X-direction and a second Y-value in the Y-direction of the second clustered set of data points.

18. The non-transitory computer-readable medium according to claim 16, wherein the first point on the first display device is a beginning of a continuous movement of the pointer to the second point on the second display device.

19. The non-transitory computer-readable medium according to claim 16, wherein the second point on the second display device is a target element selected by a user action.

20. The non-transitory computer-readable medium according to claim 16, further comprising providing for display a notification to notify a user of the misalignment between the first display device and the second display device, wherein the notification includes the adjustment value to correct a misalignment between the first display device and the second display device.

* * * * *